United States Patent Office 2,756,225
Patented July 24, 1956

2,756,225
ACID MONOAZO DYESTUFFS

Franz Frisch, Arlesheim, Switzerland, assignor to Sandoz A. G., Basel, Switzerland, a Swiss firm No Drawing. Application August 21, 1952, Serial No. 305,685

Claims priority, application Switzerland August 28, 1951

6 Claims. (Cl. 260—194)

The present invention relates to acid monoazo dyestuffs which correspond to the formula (I)
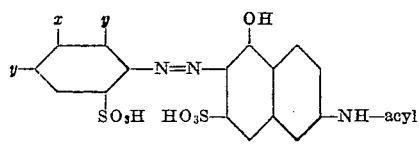

wherein "acyl" stands for the radical of a saturated aliphatic acid containing at least 8 and at most 12 carbon atoms, one $y$ stands for hydrogen or lower alkyl, the other $y$ standing for hydrogen or lower alkyl or—in the case where the one $y$ is hydrogen—forming with the adjacent $x$ the saturated hydrocarbon chain

—CH₂—CH₂—CH₂—CH₂— and wherein $x$—in the case where both $y$'s are hydrogen or lower alkyl—stands for hydrogen, halogen, alkyl, lower alkoxy, —NH-acyl, —SO₂-alkyl, —SO₂-aralkyl, —SO₂-aryl, —SO₂-cycloalkyl

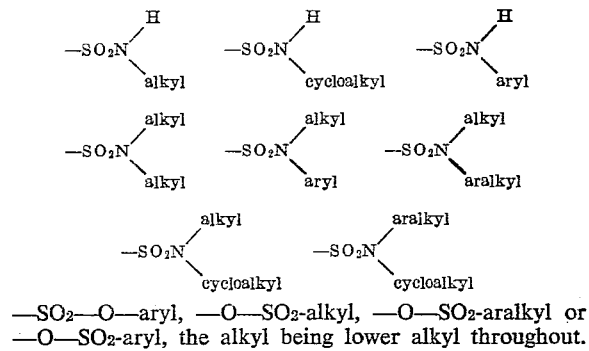

—SO₂—O—aryl, —O—SO₂-alkyl, —O—SO₂-aralkyl or —O—SO₂-aryl, the alkyl being lower alkyl throughout.

The aforesaid acid monoazo dyestuffs can be prepared by coupling a diazo compound of an aminobenzene sulfonic acid of the formula (II)
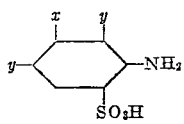

wherein $x$ and $y$ have the precedingly-indicated significances, with a 1-hydroxynaphthalene-3-sulfonic acid of the formula (III)
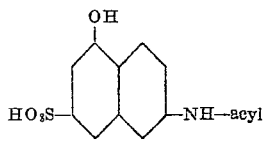

wherein "acyl" also has the precedingly-recited significances.

Suitable aminobenzene sulfonic acids of Formula II comprise inter alia the following:

1-aminobenzene-2-sulfonic acid;
1-amino-5-chlorobenzene-2-sulfonic acid;
1-amino-5-bromobenzene-2-sulfonic acid;
1-amino-5-methylbenzene-2-sulfonic acid;
1-amino-5-ethylbenzene-2-sulfonic acid;
1-amino-5-methoxybenzene-2-sulfonic acid;
1-amino-5-ethoxybenzene-2-sulfonic acid;
1-amino-5-propoxybenzene-2-sulfonic acid;
1-amino-5-N-formylaminobenzene-2-sulfonic acid;
1-amino-5-N-acetylaminobenzene-2-sulfonic acid;
1-amino-5-N-propionylaminobenzene-2-sulfonic acid;
1-amino-5-N-benzoylaminobenzene-2-sulfonic acid;
1 - amino - 5 - N - chlorobenzoylaminobenzene - 2 - sulfonic acid;
1 - amino - 5 - N - bromobenzoylaminobenzene - 2 - sulfonic acid;
1-amino-5-methylsulfonbenzene-2-sulfonic acid;
1-amino-5-ethylsulfonbenzene-2-sulfonic acid;
1-amino-5-propylsulfonbenzene-2-sulfonic acid;
1-amino-5-benzylsulfonbenzene-2-sulfonic acid;
1-amino-5-phenylsulfonbenzene-2-sulfonic acid;
1-amino-5-(methyl)-phenylsulfonbenzene-2-sulfonic acid;
1-amino-5-(chloro)-phenylsulfonbenzene-2-sulfonic acid;
1 - amino - 5 - (dimethyl) - phenylsulfonbenzene - 2 - sulfonic acid;
1-amino-5-cyclohexylsulfonbenzene-2-sulfonic acid;
1-amino-2-sulfobenzene-5-sulfonic acid-N-methylamide;
1-amino-2-sulfobenzene-5-sulfonic acid-N-ethylamide;
1-amino-2-sulfobenzene-5-sulfonic acid-N-propylamide;
1 - amino - 2 - sulfobenzene - 5 - sulfonic acid - N - cyclohexylamide;
1-amino-2-sulfobenzene-5-sulfonic acid-N-phenylamide;
1 - amino - 2 - sulfobenzene - 5 - sulfonic acid - N - (methyl)-phenylamide;
1-amino-2-sulfobenzene-5-sulfonic acid-N-(chloro)-phenylamide;
1 - amino - 2 - sulfobenzene - 5 - sulfonic acid - N - (dimethyl)-phenylamide;
1 - amino - 2 - sulfobenzene - 5 - sulfonic acid - N,N - dimethylamide;
1 - amino - 2 - sulfobenzene - 5 - sulfonic acid - N,N - diethylamide;
1 - amino - 2 - sulfobenzene - 5 - sulfonic acid - N,N - dipropylamide;
1 - amino - 2 - sulfobenzene - 5 - sulfonic acid - N,N - dibutylamide;
1 - amino - 2 - sulfobenzene - 5 - sulfonic acid - N,N - methylphenylamide;
1-amino-2-sulfobenzene-5-sulfonic acid-N,N-ethyl-phenylamide;
1-amino-2-sulfobenzene-5-sulfonic acid-N,N-propyl-phenylamide;
1-amino-2-sulfobenzene-5-sulfonic acid-N,N-butyl-phenylamide;
1-amino-2-sulfobenzene-5-sulfonic acid-N,N-methyl-benzylamide;
1-amino-2-sulfobenzene-5-sulfonic acid-N,N-ethyl-benzylamide;
1-amino-2-sulfobenzene-5-sulfonic acid-N,N-propyl-benzylamide;
1-amino-2-sulfobenzene-5-sulfonic acid-N,N-butyl-benzylamide;
1-amino-2-sulfobenzene-5-sulfonic acid-N,N-methyl-cyclohexylamide;
1-amino-2-sulfobenzene-5-sulfonic acid-N,N-ethyl-cyclohexylamide;
1 - amino - 2 - sulfobenzene - 5 - sulfonic acid - N,N - propyl-cyclohexylamide;
1-amino-2-sulfobenzene-5-sulfonic acid-N,N-butyl-cyclohexylamide;
1 - amino - 2 - sulfobenzene - 5 - sulfonic acid - N,N - benzyl-cyclohexylamide;
1-amino-2-sulfobenzene-5-sulfonic acid-phenyl ester;

1-amino-2-sulfobenzene-5-sulfonic acid-(methyl)-phenyl ester;
1-amino-2-sulfobenzene-5-sulfonic acid-(chloro)-phenyl ester;
1-amino-2-sulfobenzene-5-sulfonic acid-(dimethyl)-phenyl ester;
1-amino-5-methyl-sulfonyl-oxybenzene-2-sulfonic acid;
1-amino-5-ethyl-sulfonyl-oxybenzene-2-sulfonic acid;
1-amino-5-propyl-sulfonyl-oxybenzene-2-sulfonic acid;
1-amino-5-butyl-sulfonyl-oxybenzene-2-sulfonic acid;
1-amino-5-benzyl-sulfonyl-oxybenzene-2-sulfonic acid;
1-amino-5-phenyl-sulfonyl-oxybenzene-2-sulfonic acid;
1 - amino - 5 - (methyl) - phenyl - sulfonyl - oxybenzene-2-sulfonic acid;
1 - amino - 5 - (chloro) - phenyl - sulfonyl - oxybenzene - 2-sulfonic acid;
1 - amino - 5 - (dimethyl) - phenyl - sulfonyl - oxybenzene-2-sulfonic acid;
1-amino-4,5-dimethylbenzene-2-sulfonic acid;
1-amino-4,6-dimethylbenzene-2-sulfonic acid;
1-amino-4,6-diethylbenzene-2-sulfonic acid;
1-amino-4-methyl-5-chlorobenzene-2-sulfonic acid, etc.

Suitable aminobenzene sulfonic acids wherein the saturated hydrocarbon chain —$CH_2$—$CH_2$—$CH_2$—$CH_2$— interconnects the positions $x$ and $y$ are for example 1-amino-5,6,7,8-tetrahydronaphthalene-2-sulfonic acid and 2-amino-5,6,7,8-tetrahydronaphthalene-3-sulfonic acid.

Illustrative of suitable 1-hydroxynaphthalene-3-sulfonic acids of Formula III are inter alia 1-hydroxy-6-N-octanoylaminonaphthalene-3-sulfonic acid, 1-hydroxy-6-N-decanoylaminonaphthalene-3-sulfonic acid, 1-hydroxy-6-N-dodecanoylaminonaphthalene-3-sulfonic acid, etc.

The coupling of the diazo compound of the aminobenzene sulfonic acid of Formula II with the 1-hydroxynaphthalene-3-sulfonic acid of Formula III is effected in weak alkaline to weak acid (acetic acid) medium, advantageously in the presence of sodium bicarbonate or sodium acetate. Upon completion of the coupling, the formed dyestuff—insofar as it has not precipitated—is salted out, filtered off, and dried.

The thus-obtained dyestuffs, according to the present invention, dissolve with orange-red coloration in water and dye wool, silk and other animal fibers, as well as polyamide fibers such for example as nylon, from a neutral or weak acid bath in bright orange shades of very good fastness to light and of good fastness to perspiration and to washing.

The following examples are illustrative, but not limitative, of the invention. The parts are by weight, and the temperatures are in degrees centigrade.

*Example 1*

17.3 parts of 1-aminobenzene-2-sulfonic acid are dissolved in 50 parts of cold water and 100 parts of normal aqueous sodium hydroxide solution, and then a solution of 7 parts of sodium nitrite in 50 parts of water is added. By the addition of ice, the temperature is brought to 5-10°. While stirring, 30 parts of concentrated hydrochloric acid are then added at one time, and stirring is continued at 10-15° until the nitrous acid disappears. The formed diazo compound separates out in part.

The suspension of the diazo compound is combined with a solution of 38.6 parts of the sodium salt of 1-hydroxy-6-N-octanoylaminonaphthalene-3-sulfonic acid in 1000 parts of water at 10-15° in the presence of 20 parts of sodium bicarbonate.

Upon completion of the coupling, the resultant dyestuff which corresponds to the formula

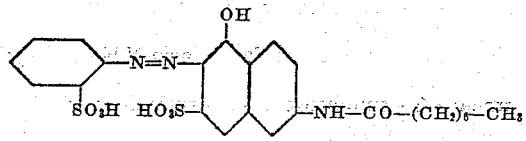

is salted out, filtered off and dried. It is an orange-colored powder which dissolves with orange coloration in water and dyes wool, silk and nylon from a weak acid bath in bright orange shades of good fastness to washing and to perspiration and of very good fastness to light.

Dyestuffs with similar properties are obtained when, in preparing the aforementioned diazo compound, the 1-aminobenzene-2-sulfonic acid is replaced by an equivalent quantity of 1-amino-5-chlorobenzene-2-sulfonic acid or of 1-amino-5-bromobenzene-2-sulfonic acid or of 1-amino-5-methylbenzene-2-sulfonic acid or of 1-amino-5-ethylbenzene-2-sulfonic acid or of 1-amino-5-methoxybenzene-2-sulfonic acid or of 1-amino-5-propoxybenzene-2-sulfonic acid or of 1-amino-5-N-formylaminobenzene-2-sulfonic acid or of 1-amino-5-N-acetylaminobenzene-2-sulfonic acid or of 1-amino-5-N-benzoylaminobenzene-2-sulfonic acid.

*Example 2*

25 parts of 1-amino-5-methylsulfonbenzene-2-sulfonic acid are diazotized, after the manner described in Example 1, and the suspension of the resultant diazo compound is combined with an aqueous suspension of 39.2 parts of 1-hydroxy-6-N-decanoylaminonaphthalene-3-sulfonic acid in 1500 parts of water in the presence of an excess of sodium acetate at 10-15°. Upon completion of the coupling, the resultant dyestuff which corresponds to the formula

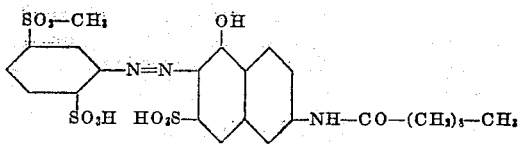

is salted out, filtered off and dried. It is an orange-colored powder which dissolves with orange coloration in hot water and dyes wool, silk and nylon in bright yellowish orange shades of good fastness to washing and to perspiration and of very good fastness to light.

Dyestuffs with similar properties are obtained when, in preparing the diazo compound according to the preceding paragraph, the 1-amino-5-methylsulfonbenzene-2-sulfonic acid is replaced by an equivalent quantity of 1-amino-5-ethylsulfonbenzene-2-sulfonic acid or of 1-amino-5-propylsulfonbenzene-2-sulfonic acid or of 1-amino-5-benzylsulfonbenzene-2-sulfonic acid or of 1-amino-5-phenylsulfonbenzene-2-sulfonic acid or of 1-amino-5-(4'-methylphenyl)-sulfonbenzene-2-sulfonic acid or of 1-amino-5-(4'-chlorophenyl)-sulfonbenzene-2-sulfonic acid or of 1-amino-2-sulfobenzene-5-sulfonic acid-N-phenylamide or of 1-amino-2-sulfobenzene-5-sulfonic acid-N-(2',4'-dimethyl)-phenylamide or of 1-amino-2-sulfobenzene-5-sulfonic acid-N,N-dimethylamide or of 1-amino-2-sulfobenzene-5-sulfonic acid-N,N-diethylamide.

Similar properties are also possessed by the dyestuff of the formula

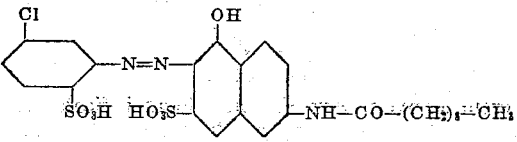

obtainable, according to the method of the present example, from diazotized 1-amino-5-chlorobenzene-2-sulfonic acid and 1-hydroxy-6-decanoylaminonaphthalene-3-sulfonic acid.

*Example 3*

33 parts of 1-amino-2-sulfobenzene-5-sulfonic acid-phenylester are diazotized, after the manner described in Example 1, and the resultant diazo suspension combined with a suspension of 42 parts of 1-hydroxy-6-N-dodecanoylaminonaphthalene-3-sulfonic acid in 1500 parts of water in the presence of an excess of sodium acetate at 10–15°. Upon completion of the coupling, the precipitated dyestuff which corresponds to the formula

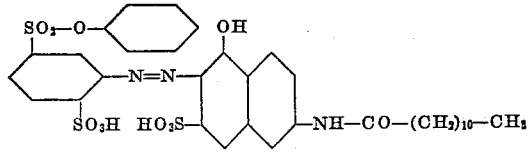

is filtered off and dried. It is an orange-colored powder which dissolves with orange coloration in hot water and dyes wool, silk and nylon from a neutral or weak acid bath in yellowish orange shades of very good fastness to washing, perspiration and light.

Dyestuffs with similar properties are obtained when, in preparing the diazo suspension according to the preceding paragraph, the 1-amino-2-sulfonbenzene-5-sulfonic acid-phenylester is replaced by an equivalent quantity of 1-amino-5-methylsulfonyl-oxybenzene-2-sulfonic acid or of 1-amino-5-ethylsulfonyl-oxybenzene-2-sulfonic acid or of 1-amino-5-butylsulfonyl-oxybenzene-2-sulfonic acid or of 1-amino-5-benzylsulfonyl-oxybenzene-2-sulfonic acid or of 1-amino-5-phenylsulfonyl-oxybenzene-2-sulfonic acid or of 1-amino-5-(2′,4′-dimethylphenyl)-sulfonyl-oxybenzene-2-sulfonic acid or of 1-amino-5-(4′-methylphenyl)-sulfonyl-oxybenzene-2- sulfonic acid or of 1-amino-5-(4′-chlorophenyl)-sulfonly-oxybenzene - 2 - sulfonic acid. The latter corresponds to the formula

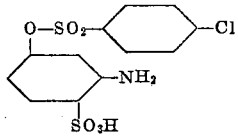

*Example 4*

17.3 parts of 1-aminobenzene-2-sulfonic acid are diazotized, after the manner described in Example 1, and the resultant suspension of the diazo compound is combined with an aqueous suspension of 41.4 parts of the sodium salt of 1-hydroxy-6-N-decanoylaminonaphthalene-3-sulfonic acid in 1200 parts of water in the presence of 20 parts of sodium bicarbonate at 10–15°. Upon completion of the coupling, the resultant precipitated dyestuff which corresponds to the formula

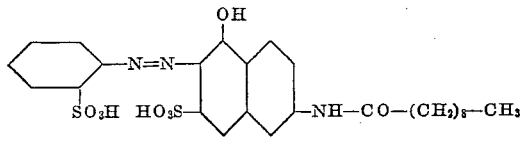

is filtered off and dried. It is an orange-colored powder which dissolves with orange coloration in hot water and dyes wool, silk and nylon in bright orange shades of good fastness to washing and perspiration and of very good fastness to light.

Dyestuffs with similar properties are obtained when, while otherwise proceeding according to the preceding paragraph, the 1-hydroxy-6-N-decanoylaminonaphthalene-3-sulfonic acid is replaced by an equivalent quantity of 1 - hydroxy-6-N-dodecanoylaminonaphthalene - 3 - sulfonic acid, and/or the 1-aminobenzene-2-sulfonic acid, used in preparing the diazo compound, is replaced by an equivalent quantity of 1-amino-2-sulfobenzene-5-sulfonic acid-N,N-methyl-benzylamide or of 1-amino-2-sulfobenzene-5-sulfonic acid-N,N-ethyl-benzylamide or of 1-amino-2-sulfobenzene-5-sulfonic acid - N,N - methylcyclohexylamide or of 1-amino-2-sulfobenzene-5-sulfonic acid-N,N-ethyl-cyclohexylamide or of 1-amino-2-sulfobenzene-5-sulfonic acid-N,N-benzyl-cyclohexylamide.

The dyestuff from diazotized 1-aminobenzene-2- sulfonic acid and 1-hydroxy-6-N-dodecanoylaminonaphthalene-3-sulfonic acid corresponds to the formula

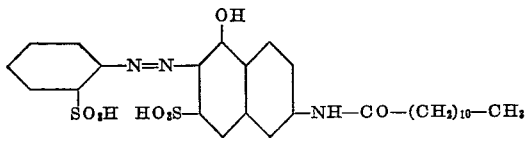

*Example 5*

25 parts of 1-amino-5-methylsulfonbenzene-2-sulfonic acid are diazotized, after the manner described in Example 1, and the resultant suspension of the formed diazo compound is combined with an aqueous suspension of 42 parts of 1-hydroxy-6-N-dodecanoylaminonaphthalene-3-sulfonic acid in 1500 parts of water in the presence of an excess of sodium acetate at 10–15°. Upon completion of the coupling, the resultant precipitated dyestuff which corresponds to the formula

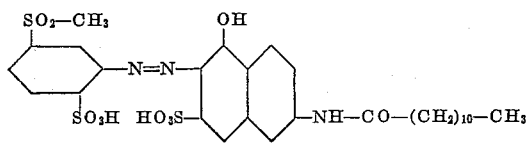

is filtered off and dried. It is an orange-colored powder which dissolves with orange coloration in hot water and dyes wool, silk and nylon in bright yellowish orange shades of good fastness to washing and to perspiration and of very good fastness to light.

Dyestuffs with similar properties are obtained when, while otherwise proceeding according to the preceding paragraph, the 1-hydroxy-6-N-dodecanoylaminonaphthalene-3-sulfonic acid is replaced by an equivalent amount of 1-hydroxy-6-N-octanoylaminonaphthalene-3-sulfonic acid and/or the 1-amino-5-methylsulfonbenzene-2-sulfonic acid, used in preparing the diazo compound, is replaced by an equivalent amount of 1-amino-5-ethylsulfonbenzene-2-sulfonic acid or of 1-amino-5-butylsulfonbenzene-2-sulfonic acid or of 1-amino-5-chlorobenzene-3-sulfonic acid or of 1-amino-5-bromobenzene-2-sulfonic acid or of 1-amino-5-methylbenzene-2-sulfonic acid or of 1-amino-5-ethylbenzene-2-sulfonic acid.

*Example 6*

23 parts of 1-amino-5-N-acetylaminobenzene-2-sulfonic acid are diazotized, after the manner described in Example 1, and the resultant suspension of the formed diazo compound is combined with an aqueous suspension of 39.2 parts of 1-hydroxy-6-N-decanoylaminonaphthalene-3-sulfonic acid in 1200 parts of water in the presence of an excess of sodium bicarbonate at 10–15°. Upon completion of the coupling, the dyestuff which corresponds to the formula

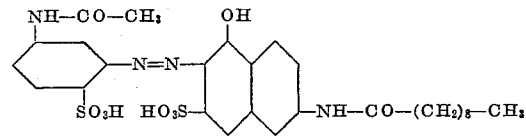

is salted out, filtered off and dried. It is an orange-colored powder which dissolves with orange coloration in hot water and dyes wool, silk and nylon from a weak acetic acid bath in bright orange shades of good fastness to washing and to perspiration and of very good fastness to light.

A dyestuff with similar properties is obtained when, while otherwise proceeding as described in the preceding paragraph, the 1-hydroxy-6-N-decanoylaminonaphthalene-3-sulfonic acid used for the coupling, is replaced by an equivalent amount of 1-hydroxy-6-N-dodecanoylaminonaphthalene-3-sulfonic acid and/or the 1-amino-5-N-acetylaminobenzene-2-sulfonic acid, used in preparing the diazo compound, is replaced by an equivalent amount of 1-amino-5-N-butyrylaminobenzene-2-sulfonic acid or of 1-amino-5-N-benzoylaminobenzene-2-sulfonic acid.

Example 7

22.2 parts of 1-amino-4-methyl-5-chlorobenzene-2-sulfonic acid are diazotized, after the manner described in Example 1, and the resultant aqueous suspension of diazo compound is combined with a suspension of 38.6 parts of 1-hydroxy-6-N-octanoylaminonaphthalene-3-sulfonic acid in 1500 parts of water in the presence of an excess of sodium bicarbonate at 10–15°. Upon completion of the coupling, the precipitated dyestuff, correspondnig to the formula

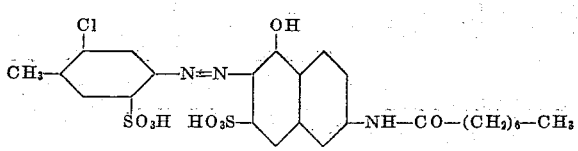

is filtered off and dried. It is an orange-colored powder which dissolves with orange coloration in hot water and dyes wool, silk and nylon from a weak acid bath in bright orange shades of good fastness to washing and to perspiration and of very good fastness to light.

Example 8

22.7 parts of 2-amino-5,6,7,8-tetrahydronaphthalene-3-sulfonic acid are diazotized, after the manner described in Example 1, and the resultant suspension of diazo compound is combined with a suspension of 39.2 parts of 1-hydroxy-6-N-decanoylaminonaphthalene-3-sulfonic acid in 1500 parts of water in the presence of an excess of sodium bicarbonate at 10–15°. Upon completion of the coupling, the precipitated dyestuff which corresponds to the formula

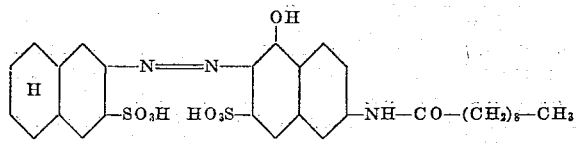

is filtered off and dried. It is an orange-colored powder which dissolves with orange coloration in hot water and dyes wool, silk and nylon in bright reddish orange shades of good fastness to washing and to perspiration and of very good fastness to light.

A similar dyestuff is obtained when, in the foregoing, the 2-amino-5,6,7,8-tetrahydronaphthalene-3-sulfonic acid is replaced by the corresponding quantity of 1-amino-5,6,7,8-tetrahydronaphthalene-2-sulfonic acid.

Example 9

20.1 parts of 1-amino-4,5-dimethylbenzene-2-sulfonic acid are diazotized, after the manner described in Example 1, and the resultant suspension of diazo compound is combined with a suspension of 42 parts of 1-hydroxy-6-N-dodecanoylaminonaphthalene-3-sulfonic acid in 1500 parts of water in the presence of an excess of sodium bicarbonate at 10–15°. Upon completion of the coupling, the precipitated dyestuff which corresponds to the formula

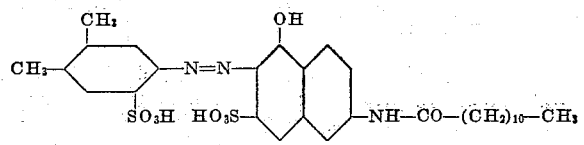

is filtered off and dried. It is an orange-colored powder which dissolves with orange coloration in hot water and dyes wool, silk and nylon from a neutral or weak acid bath in reddish orange shades of very good fastness to washing, perspiration and light.

A dyestuff with similar properties is obtained when, in preparing the aforesaid diazo compound, the 1-amino-4,5-dimethylbenzene-2-sulfonic acid is replaced by an equivalent quantity of 1-amino-4,6-dimethylbenzene-2-sulfonic acid or of 1-amino-4,6-diethylbenzene-2-sulfonic acid.

Example 10

1 part of a dyestuff according to any one of Examples 1 to 9, 10 parts of sodium sulfate and 2 parts of acetic acid are dissolved in 8000 parts of water. 100 parts of wool are introduced into the solution at 40–50°, and the whole then boiled for 30 minutes. The dyebath is then cooled to 70° and, after the addition of 2 parts of formic acid, again boiled for 30 minutes. The wool, which is thus dyed in a fast shade, is rinsed and dried.

A similar result is obtained if the 2 parts of formic acid are replaced by 3 parts of acetic acid.

Nylon and silk are dyed in like manner, although in the case of silk the boiling is omitted and the bath heated to 90–95°.

Having thus disclosed the invention, what is claimed is:
1. An acid monoazo dyestuff which corresponds to the formula

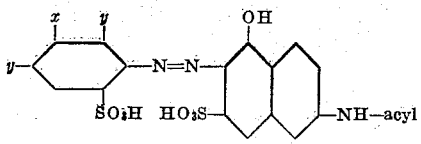

wherein acyl stands for the radical of a saturated aliphatic acid containing at least 8 and at most 12 carbon atoms, one y stands for a member selected from the group consisting of hydrogen and lower alkyl, the other y for a member selected from the group consisting of hydrogen and lower alkyl and—in the case where the one y is hydrogen—forms with the adjacent x the saturated hydrocarbon chain —CH₂—CH₂—CH₂—CH₂—, and wherein x—in the case where both y's are hydrogen or lower alkyl—stands for a member selected from the group consisting of hydrogen, chlorine, bromine, lower alkyl, lower alkoxy, —NH-acyl, —SO₂-alkyl, —SO₂-aralkyl, —SO₂-aryl, —SO₂-cycloalkyl.

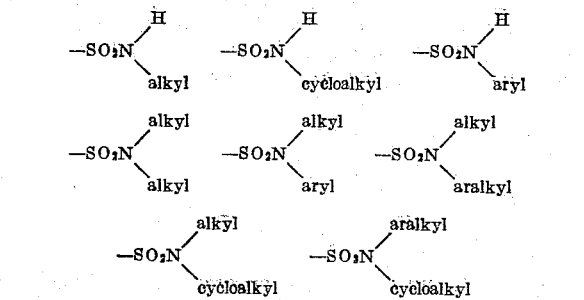

—SO₂—O-aryl, —O—SO₂-alkyl, —O—SO₂-aralkyl and —O—SO₂-aryl, the alkyl being lower alkyl throughout.

2. The acid monoazo dyestuff which corresponds to the formula

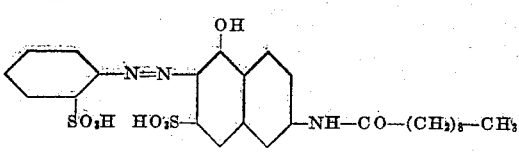

3. The acid monoazo dyestuff which corresponds to the formula

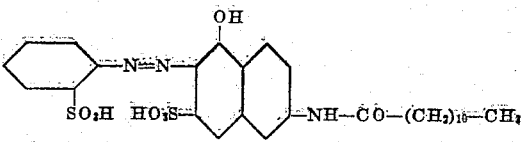

4. The acid monoazo dyestuff which corresponds to the formula
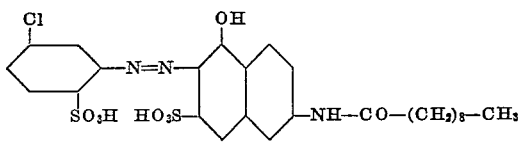
5. The acid monoazo dyestuff which corresponds to the formula
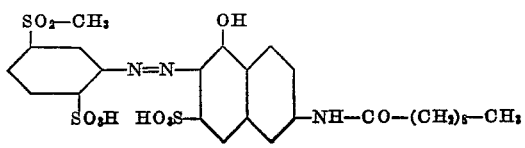
6. The acid monoazo dyestuff which corresponds to the formula
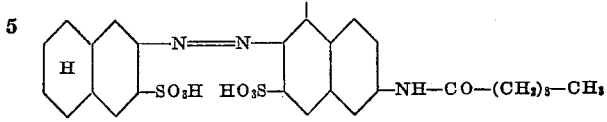
References Cited in the file of this patent
UNITED STATES PATENTS
| | | |
|---|---|---|
| 2,034,247 | Reindel et al. | Mar. 17, 1936 |
| 2,102,115 | Fleischhauer et al. | Dec. 14, 1937 |